United States Patent [19]
Howard

[11] Patent Number: 5,673,874
[45] Date of Patent: *Oct. 7, 1997

[54] EXTERNAL SLIDING AIRCRAFT DOOR

[75] Inventor: Durrell U. Howard, San Antonio, Tex.

[73] Assignee: AirDoor, Inc., San Antonio, Tex.

[*] Notice: The term of this patent shall not extend beyond the expiration date of Pat. No. 5,259,576.

[21] Appl. No.: 338,492

[22] PCT Filed: May 17, 1993

[86] PCT No.: PCT/US93/05026

§ 371 Date: Dec. 19, 1994

§ 102(e) Date: Dec. 19, 1994

[87] PCT Pub. No.: WO93/23287

PCT Pub. Date: Nov. 25, 1993

Related U.S. Application Data

[63] Continuation of Ser. No. 884,179, May 18, 1992, Pat. No. 5,259,576.

[51] Int. Cl.$^6$ .................................................. B64C 1/14
[52] U.S. Cl. ........................................ 244/129.5; 244/129.4; 49/40
[58] Field of Search ................................ 244/129.5, 129.4; 49/40, 404, 411; 105/341; 296/202, 155, 146.1, 146.5, 146.8, 146.9

[56] References Cited

U.S. PATENT DOCUMENTS

| | | | |
|---|---|---|---|
| 298,794 | 5/1884 | Stone | 49/40 |
| 2,378,856 | 6/1945 | Laddon et al. | 244/129.5 |
| 2,445,131 | 7/1948 | Wartian | 244/129.5 |
| 4,991,905 | 2/1991 | Watanabe et al. | 296/155 |
| 5,181,677 | 1/1993 | Kaplan et al. | 244/129.5 |

FOREIGN PATENT DOCUMENTS

| | | | |
|---|---|---|---|
| 1218290 | 6/1966 | Germany | 244/129.5 |

*Primary Examiner*—Christopher P. Ellis
*Attorney, Agent, or Firm*—Pollock, Vande Sande & Priddy

[57] ABSTRACT

A sliding door for covering an opening (102) in an aircraft fuselage (100) including a sliding door member (10) mounted on the fuselage and adapted for sliding in the longitudinal direction of the fuselage between an opened and a closed position. Supporting and guiding means (30, 31, 32, 33) on the sliding door member (10) and the fuselage for supporting the sliding door in the opened and closed position and supporting and guiding sliding movement of the sliding door member (10) between the open and closed position.

14 Claims, 6 Drawing Sheets

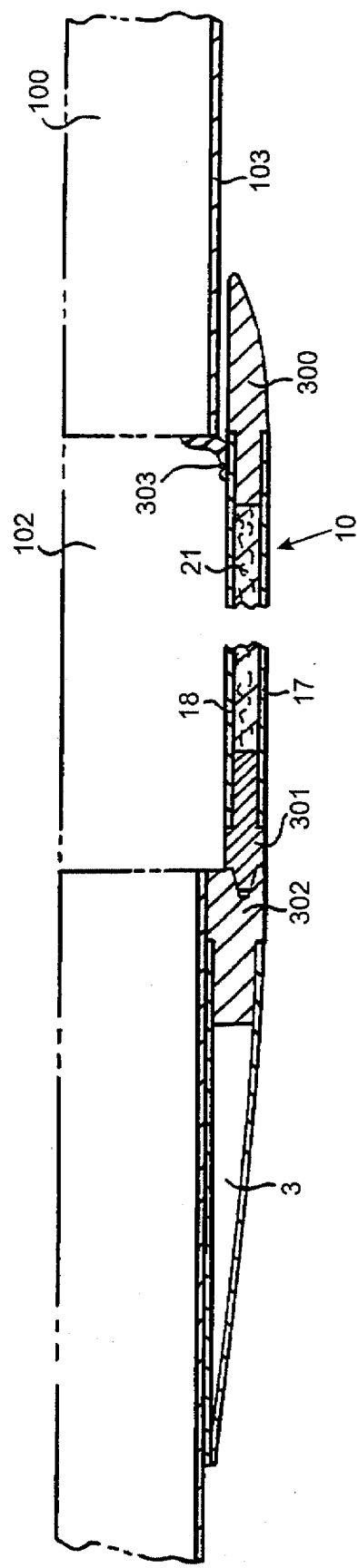

EXTERNAL SLIDING AIRCRAFT DOOR

This application is a 371 of PCT/US93/05026 filed May 17, 1993, published as WO93/23287 Nov. 25, 1993, which is a continuation of U.S. patent application Ser. No. 07/884, 179, filed May 18, 1992, now U.S. Pat. No. 5,259,576.

FIELD OF THE INVENTION

The present invention relates to an improved door for a pressurized aircraft and more particularly relates to a sliding door for enabling ingress and egress to passengers and/or cargo.

BACKGROUND OF THE INVENTION

Although sliding doors are commonly used in some styles of motor vehicles such as passenger and cargo vans and trucks, their construction and mode of operation are wholly unsuited for use in pressurized aircraft. It is therefore not surprising that heretofore doors of this kind have found no application in aircraft of the kind described.

Aircraft design always necessarily involves numerous tradeoffs in strength, safety, and weight. Those same factors are, of course, involved in the design of an aircraft door. Because of the large pressure difference existing between the exterior and interior of an aircraft intended for operation at altitudes above 35,000 feet, the total force acting on an aircraft door is enormous. The total force acting upon a cargo door with an area which normally is much greater than a passenger door presents an even greater problem.

The design of the door and the related fuselage must take into account the transfer of the force to the fuselage which, simply described, comprises principally a plurality of longitudinally spaced bulkheads of aluminum or other lightweight metal and quite thin aluminum outer skin. When a conventional hinged aircraft door is opened, the weight of the door is carried by a plurality of spaced hinges to the fuselage. Although the door is then not subjected to large air pressure differential on its opposite sides, the door nevertheless exerts a very large turning moment on the supporting hinges.

These unique design considerations inherent in the design of a pressurized aircraft are, of course, entirely different from those involved in the design of, for example, a panel truck or van. Such vehicles are not subjected to the enormous pressure differences that exist only at high altitude. Also, the weight factor is not nearly as crucial in such vehicles as it is in an aircraft and therefore such a door can readily be made as strong as may be required.

The conventional hinged aircraft doors now universally used have frequently presented safety problems. Several instances have been documented in which such a door has inadvertently become opened at high altitude with catastrophic results. Another disadvantage associated with the common hinged door has been in connection with modification of a passenger aircraft to adapt it for service in hauling cargo where the installation of large cargo doors in substitution for the normal passenger doors has proved to be not only very costly but to involve many months of down time for the aircraft which is, of course, a large contributing cost factor in any such conversion.

The aircraft door of the present invention overcomes the drawbacks described above to a remarkable degree. Using techniques quite different from those used in automotive vehicles such as vans and the like, the aircraft door of this invention, as will be further described herein, is inherently safe, readily transfers the pressure forces from the door to the aircraft's fuselage, and can be installed with significantly less labor costs, and much less downtime when retrofitting an existing aircraft for cargo hauling.

SUMMARY OF THE INVENTION

The main object of the present invention is to provide a door for a pressurized aircraft that is simple in design and operation, and at the same time is safer and more reliable.

Another object of the present invention is to provide a sliding cargo or passenger door for an aircraft which is mounted on the aircraft and opens and closes without the use of hinges or other such articulating means.

A still further object of the present invention is to provide a door for a pressurized aircraft that is also secured in part by the pressurization of the aircraft.

A further additional object of the present invention is to provide a door that is lighter, less complex, and less expensive to install than presently known doors for pressurized aircraft.

Another object of the present invention is to provide a door for a pressurized aircraft which is designed to be mounted externally with little aerodynamic effect on the aircraft.

Still another object of the present invention is to provide a door which can advantageously be used in retrofitting a passenger aircraft for use as a cargo aircraft, making the process of conversion less costly and less time consuming since mounting of the present sliding door requires less modifications to the aircraft.

The present invention replaces the known complex hinged aircraft door with a sliding door mounted through guide and supporting means including for example, a simple rail and track combination. With the present invention door, rather than transferring the stress placed on the door to the fuselage at a few concentrated locations, it is distributed along the entire periphery of the door, making necessary changes to the fuselage on retrofitting less complex. Further, as the aircraft gains altitude so that the pressure differential between the inner and outer sides increases, with a resultant increase in the stress on the door, the sliding door of this invention will seal tighter through the interlocking guiding and supporting means, thereby further securing locking of the doors in the closed position during flight.

The above and other advantages of the present invention are achieved by the structure as described below in combination with the accompanying drawings showing preferred embodiments of the present invention.

BRIEF DESCRIPTION OF THE DRAWINGS

FIG. 10 shows an overhead cross-sectional view of the sliding aircraft door of the invention.

DETAILED DESCRIPTION OF THE PREFERRED EMBODIMENTS

Figure 1:
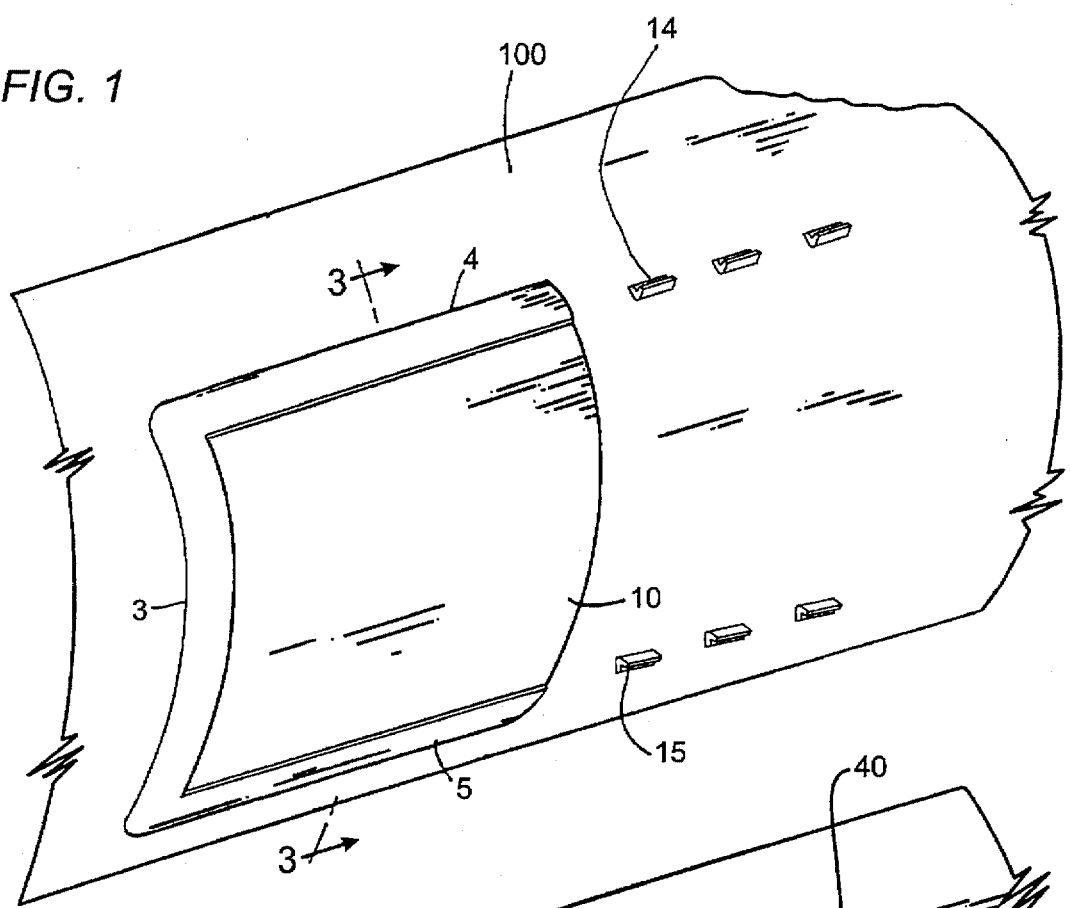
FIG. 1 is a perspective view of one embodiment of the present invention sliding aircraft door mounted on the fuselage of an aircraft with the door in the closed position.
Figure 2:
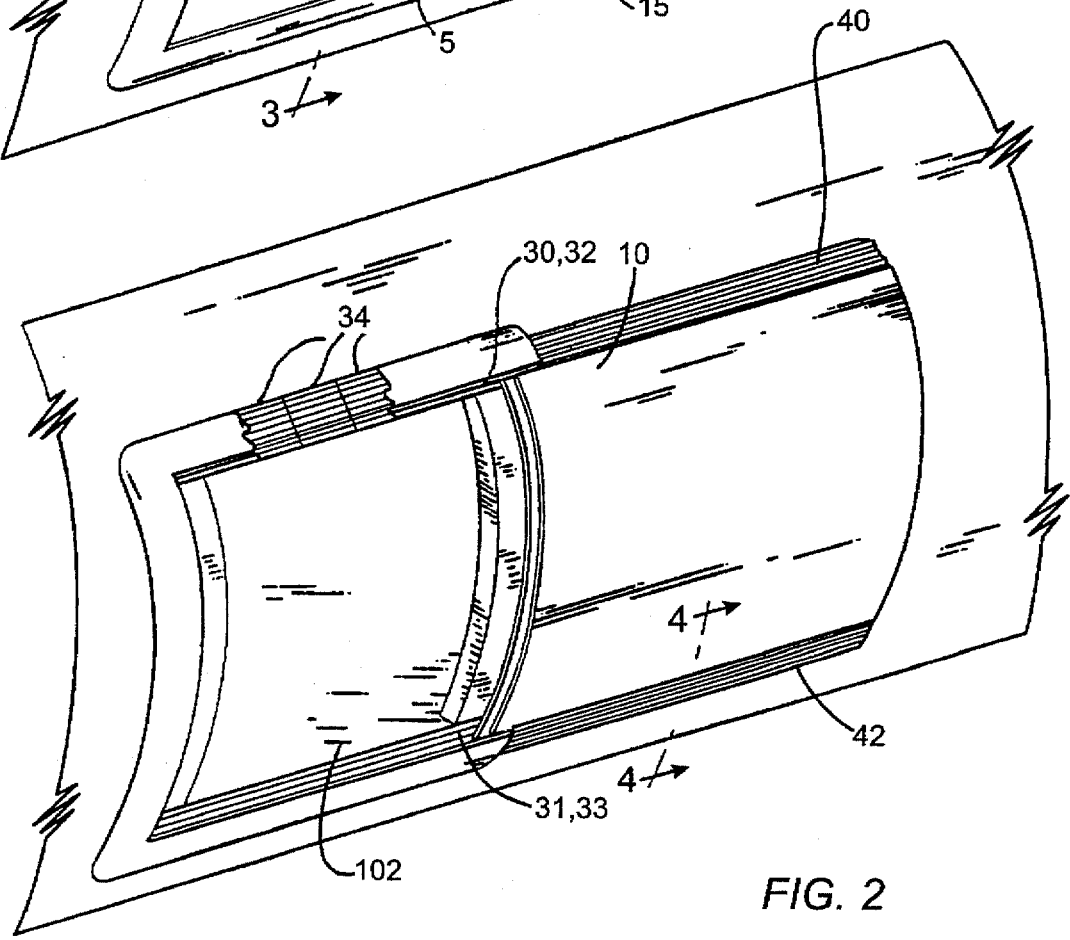
FIG. 2 is a perspective view of the embodiment shown in FIG. 1 with the door in the open position.

As seen in FIGS. 1 and 2 the sliding aircraft door arrangement of the invention may, comprise a simple sliding door member 10 for closing a doorway 102 in the fuselage 100. The door member may also include two or more substantially vertically divided sections. The door member 10 is externally attached and secured to the fuselage 100 by guiding and supporting means adapted for supporting the door member 10 in its opened or closed position and for guiding and supporting the sliding movement of the door member between the closed and opened position.

FIG. 1 shows the sliding door in a closed position with the door member 1 covering the opening 102 in the fuselage 100. FIG. 2 shows the door member 10 supported on the fuselage 100 in the opened position. The door and its accompanying hardware may be designed such that the door slides between closed and opened position in one of a number of directions. For instance, the door can slide in either direction along the longitudinal axis of the aircraft, i.e. to open as it slides in the aft direction or to open as it slides towards the front of the plane. In a door including two sections, a first section could slide toward the front of the aircraft and a second section could slide in the aft direction.

As is clear from FIGS. 1 and 2 in this embodiment the door is designed to slide in the aft direction to its open position. The guiding and supporting means preferably includes track means 30, 31, 32, 33 provided along the top and bottom of the fuselage opening 102, and corresponding rail means 40, 42 provided along the top and bottom edge of the door member 10 and adapted to cooperate with track means 30, 31, 32, 33 to support the door member 10 in its closed position and to guide its movement between its open and closed positions (see for example FIG. 3). The guiding and supporting means also comprises a plurality of guide members 114, 115 designed to cooperate with rail means 40, 42 for supporting the door member 10 on the fuselage 100 in its open position and to guide its sliding movement.

Figure 3:
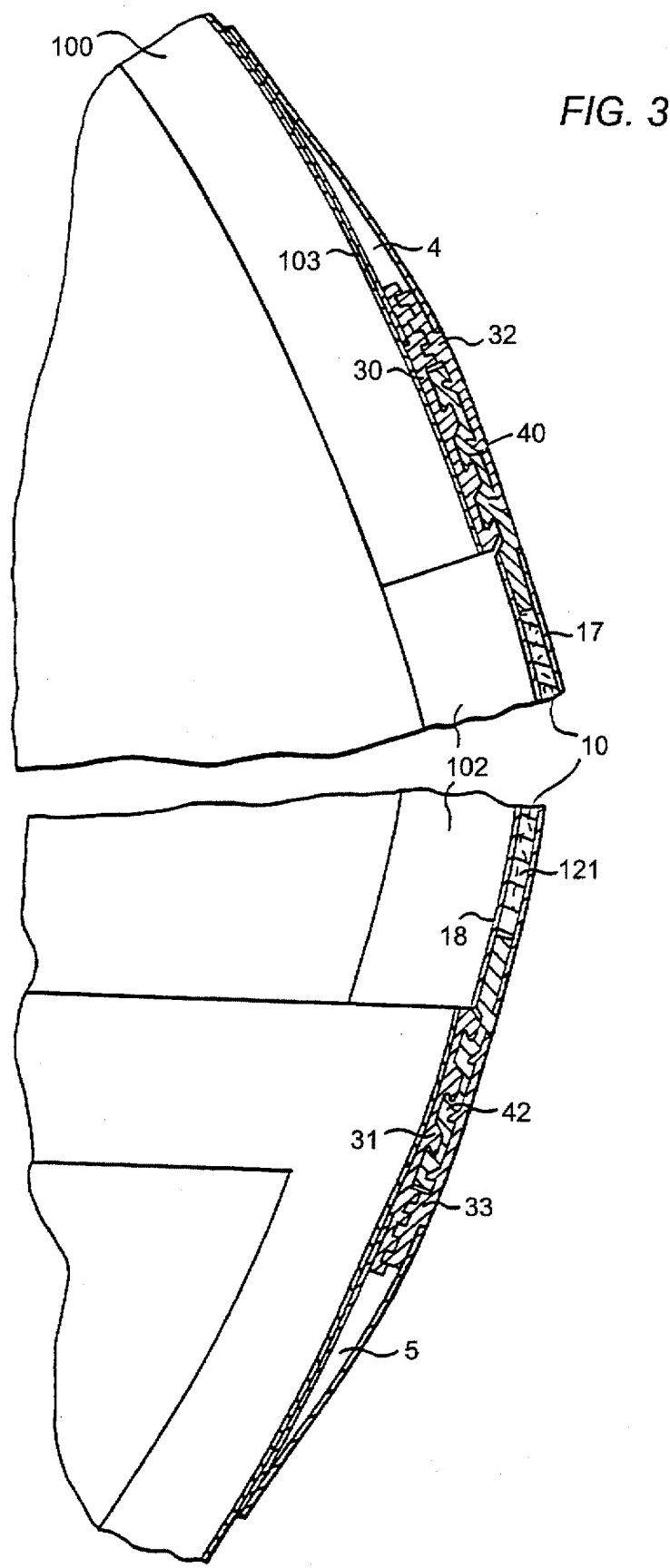
FIG. 3 is a cross-sectional view of the present invention sliding aircraft door taken along line A-A' in FIG. 1.

The sliding aircraft door of the invention is aerodynamically quite smooth and has a relatively thin profile, as can be seen for example, from the cross-sectional view of FIG. 3, thereby producing only a slight drag to the aircraft. Also, aerodynamically shaped fairings 3, 4, and 5 are provided around the edges of the opening 102 to further reduce the drag produced by the door as the it protrudes slightly into the airstream. A similar fairing may also be attached to the aft end of the door so as to reduce further the drag that the partially protruding door might produce to the airflow over the aircraft's fuselage.

As also seen in FIG. 3, the aircraft door member may be shaped so as to conform to the curved shape of the surface of the aircraft where the opening 102 to be covered by the door member 10 is formed. The relation between the fairings 4 and 5, the aircraft's exterior fuselage surface, and the door member 10 can also be seen in cross-section in FIG. 3.

The door member 10 is preferably formed of an inner skin 18 and an outer skin 17. The inner and outer skins are secured to a frame 121. The frame 121 incorporated into the door member 10 provides the structural strength for the door member as well as a mounting surface for the inner and outer skin 18, 17 (see FIG. 4).

Figure 4:
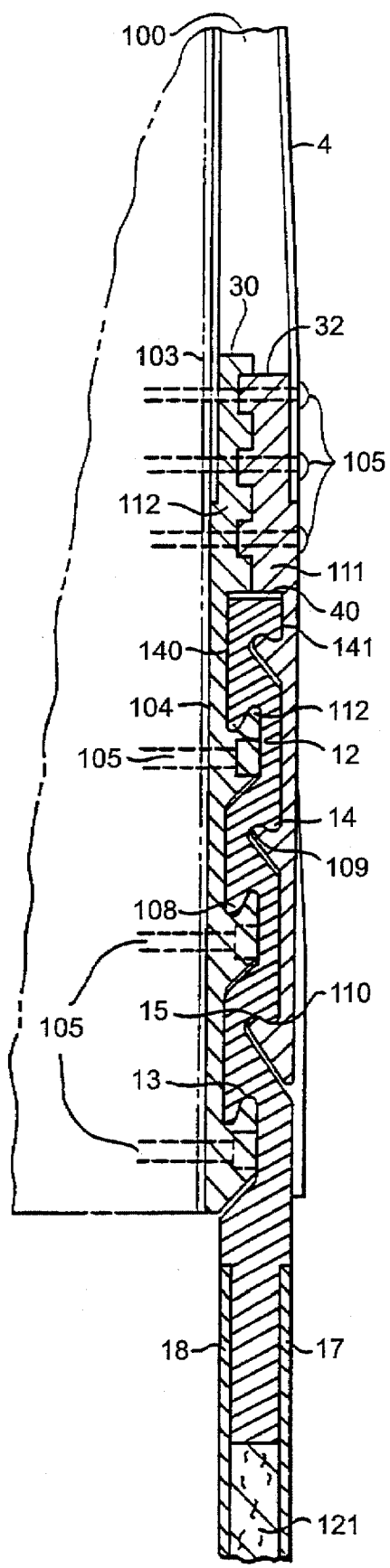
FIG. 4 shows a detailed cross-sectional view of the upper part of the sliding aircraft door shown in FIG. 3.

FIG. 4, shows also in more detail the structure of a preferred embodiment of the present door arrangement in which means for supporting and guiding an aircraft door including the track means and corresponding rail means on the door member is designed as a very simple system of interlocking lips and recesses. Such a system for guiding and supporting an aircraft door replaces the traditional hinges and latches present in aircraft doors today.

As shown in FIG. 3 the guiding and supporting means of the invention may include an upper track means 30, 32 and a lower track means 31, 33. FIG. 4 shows in detail a cross-section of the upper track means 30, 32 with the door member 10 supported thereby. The upper track means 30, 32 preferably includes an upper inner fuselage track 30 which may be attached to the fuselage wall 103 by bolts 105. The upper inner fuselage track 30 includes a main part 104 mounted on the fuselage wall 103 and at least one lip 112 protruding outwardly and upwardly from the surface of the main part 104 to form a recess 108 therebetween. The embodiment shown in FIG. 4 includes three such lip and recess elements 112, 108. The main part of the upper fuselage track preferably is divided into a plurality of closely adjacent sections 34 as seen in cut away view in FIG. 2 so that a structural failure of one segment will not result in a catastrophic failure of the door holding and guiding means. Dividing the track into sections provides a failsafe mechanism whereby if the structural integrity of one section fails, the other sections will be unaffected and continue to support the door. Alternatively, the corresponding door rail, as described below, preferably may be divided into a plurality of closely adjacent segments. Bolts 105 which secure the upper inner fuselage track 30 to the fuselage may be inserted through both the lip 112 and the main part 104 as shown in FIG. 4. The bolts may also be positioned in other ways and alternative means of attaching the track- may also be used.

In the embodiment shown in FIG. 4, an outer upper fuselage track 32 is employed to provide additional means for securing and guiding the present invention sliding aircraft door, but such use of an outer fuselage track is optional. The outer upper fuselage track may include lips 109 and recesses 110 similar to those of the upper inner fuselage track 30, and the number of these corresponds to the number of lip and recess elements of the upper inner fuselage track 30. As described above for the inner upper fuselage track, the outer upper fuselage track preferably may be divided into a plurality of closely adjacent segments as the upper inner door track.

Attached to the upper portion of the door member 10 between the inner and outer skin 17, 18 is an upper door rail 40 constituting part of rail means 40, 42. The inner surface 140 of the upper door rail 40 may be complementary to the surface of the upper inner fuselage track 30 so as to allow the door rail to ride on the fuselage track. The upper door rail 40 therefore includes downwardly and outwardly protruding lips 12 and corresponding recesses 13 so that lips. 12 slide along the channels formed by recesses 108 of the upper inner fuselage track 30, whereas recesses 13 accommodate lips 112. The upper door rail may be comprised of a plurality of abutting sections as described above.

If an upper outer fuselage track is also provided then the outer surface 141 of the upper door rail 40 preferably has an outwardly and downwardly extending lip 14 and a corresponding recess 15, the lip and recess being complementary to those forming the inner surface of the upper outer fuselage track. The embodiment shown in FIG. 4 has three longitudinally spaced lip and recess combinations on each of the inner and outer surfaces 140, 141 of the upper door rail 40.

In this embodiment, the upper outer fuselage track 32 may be secured to the fuselage by bolts 113 extending through the extension 111 of the upper outer fuselage track 32 and the upper extension 112 of the upper inner fuselage track 30. The same bolts 113 may also be used to secure the fairing 4 to the fuselage 100.

Figure 6:
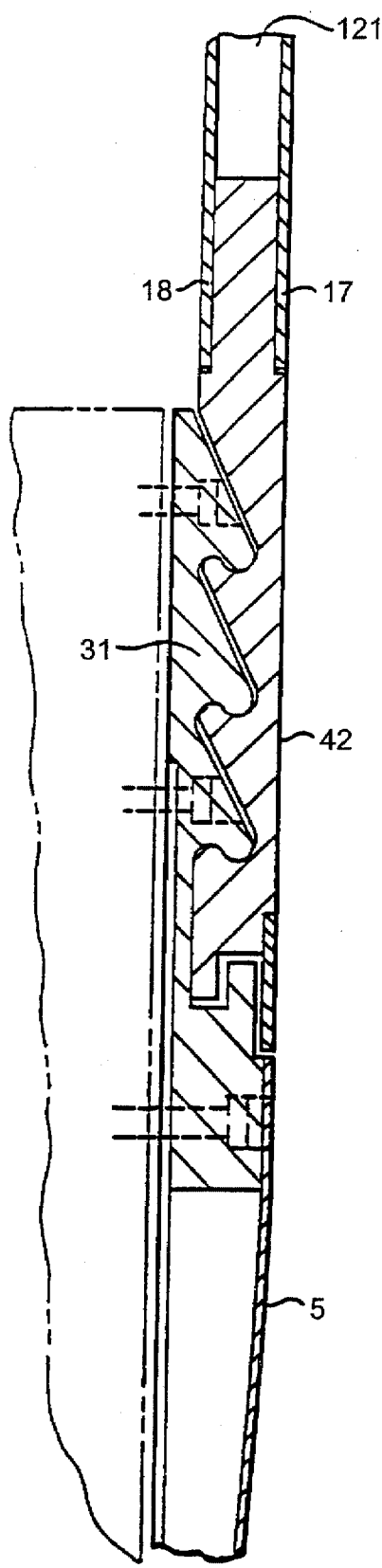
FIG. 6 shows a cross-sectional view of the lower part of the sliding aircraft door of this invention shown in FIG. 3.

As already described above and shown in FIG. 3 the guiding and supporting means also includes a lower inner fuselage track 31 having a structure corresponding to that of the upper inner fuselage track 30, and a lower door rail 42 similar in structure to that of the upper door rail 40 as seen in FIG. 3 and 6. Additionally, the door assembly includes a lower outer fuselage track 33 and similarly the door will have a lower outer rail part on the door rail 42.

When the present invention door member 10 is mounted on the fuselage, the lips and recesses on the rail means 40, 42, of the door member 10 interlock with the lips and recesses on the fuselage track means 30, 31, 32, 33, to guide and support the door in a very simple but secure manner. As clearly apparent from the above description the shape of the track means and rail means is designed to allow for the door member to slide easily between an open and closed position. The surface of both the door rail and the fuselage tracks can be coated with, among other things, a TEFLON coating. TEFLON is a trademark for a chemically resistant, heat stable plastic polymer of fluorine and ethylene having a wide range of applications in industry and electronics. Alternatively, extruded plastic caps may be used in place of a TEFLON coating, providing a better air seal on the sliding parts. The sliding members must be lubricated to prevent sticking and galling.

Figure 5:
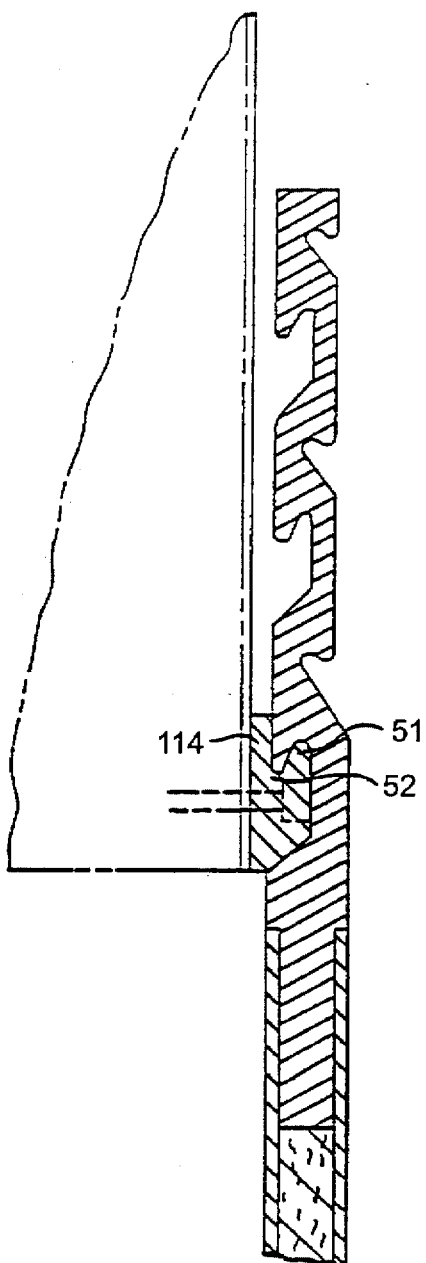
FIG. 5 shows a detailed cross-sectional view taken along line B-B' in FIG. 5.
Figure 7:
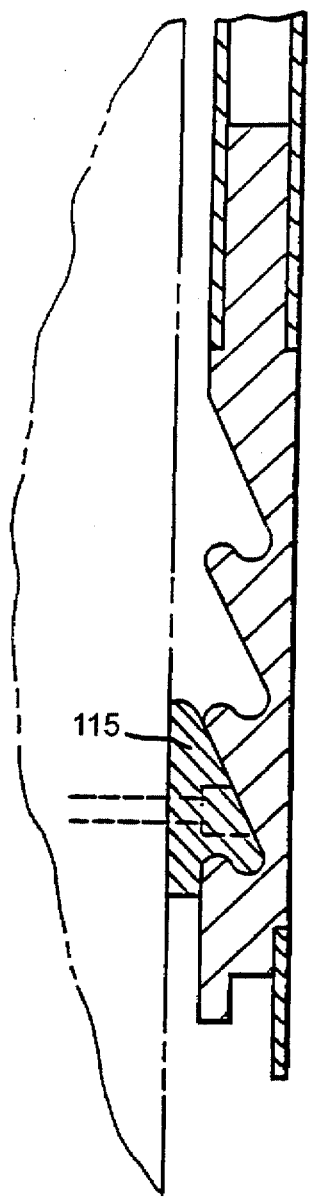
FIG. 7 shows a cross-sectional view of the lower part of the embodiment of the sliding aircraft door of this invention shown in FIG. 6 in the open position.

The guiding and supporting means may also include guide members 114 and 115. As the door opens, door guide members 114 and 115 mounted on the fuselage, as shown in FIG. 1, guide and support the door into the opened position. As shown in FIGS. 5 and 7, the door guides 114 and 115 are preferably shaped in cross-section similar to the fuselage tracks also including lips 51 and corresponding recesses 52. However, rather than being a continuous piece as the fuselage tracks, the door guides may comprise a plurality of separate pieces spaced longitudinally along the fuselage as shown in FIG. 1. In this embodiment, the door guides 114 and 115 form one upper and one lower row on the fuselage so that each now engages one of the recesses of the door upper and lower rail.

FIG. 6 shows in more detail the lower door rail and the associated lower fuselage track. This embodiment lacks an outer lower fuselage track. FIG. 7 shows the lower door rail as mounted on the guide member 115.

An alternative embodiment of the fuselage track means and door rail means. The rail means with lips and recesses shown in the embodiment of FIG. 4 are replaced here with wing-shaped rail means 200.

In this alternative embodiment, the wing-shaped rail 200, which preferably may be divided into a plurality of closely adjacent segments is attached to the door member 10. The wing elements 204 include a stalk 201, and an upper wing 202 and a lower wing 203 protruding from the stalk. A recess 205 between the wings 202, 203 provides a place for bolts which connect wing elements 204 to the door member. As in the embodiment described above in connection with FIGS. 1–6, the surface of the wing-shaped rail in this embodiment may be coated with TEFLON, an extruded plastic cap, or other such means which make the door easily slidable.

Figure 8:
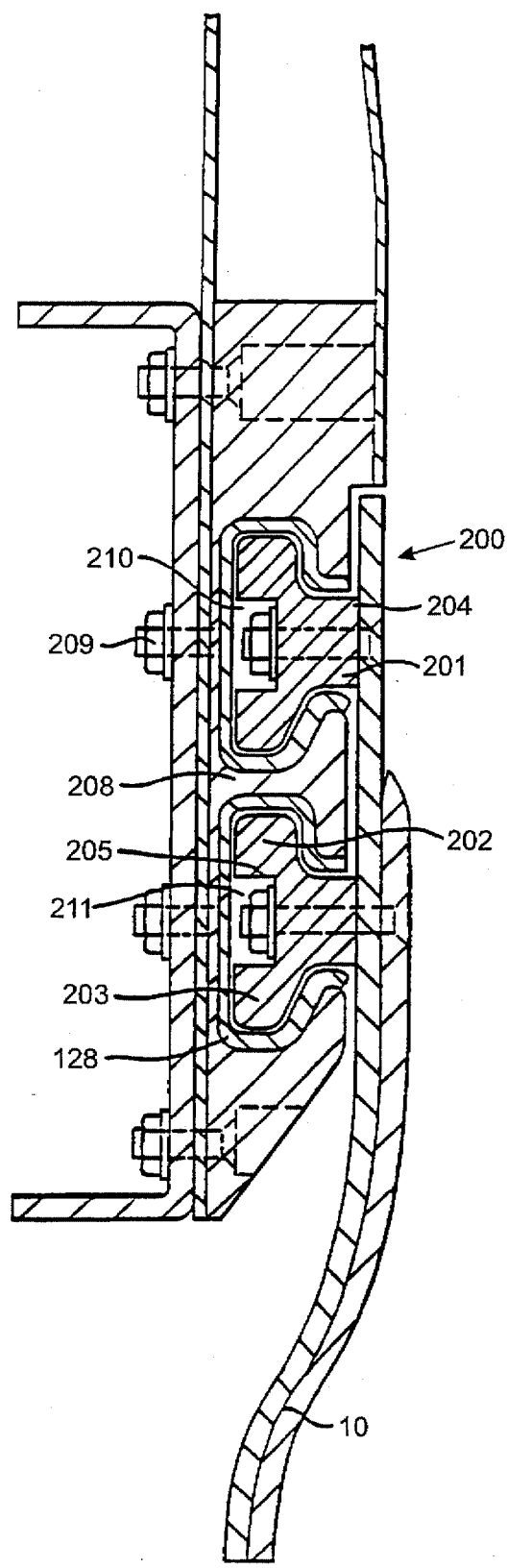
FIG. 8 shows a cross-sectional view of an alternative embodiment of the sliding aircraft door of this invention.
Figure 9:
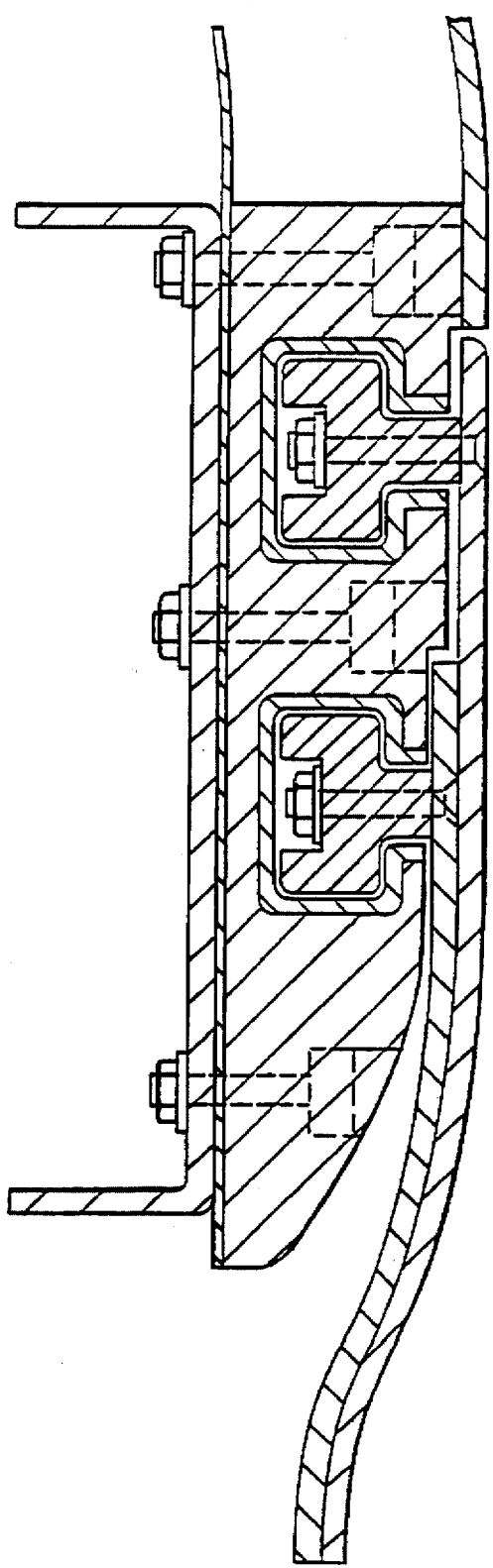
FIG. 9 shows a cross-sectional view of another alternative embodiment of the sliding aircraft door of this invention.

The fuselage track means 208 in this alternative embodiment of the present invention has a shape complementary to that of the wing-shaped door rail 200. This fuselage track preferably has two recesses 210, 211 into which the upper and lower halves of the wing-shaped door rail extensions fit. An opening of the fuselage track 208 is shaped to conform to the cross section of the stalk 201 of the wing-shaped rail 200. The elongate fuselage track preferably is divided along its length into a plurality of closely spaced adjacent segments so that a structural failure of one segment will not result in a catastrophic failure of the door holding and guiding means. The fuselage track can be lined with a plastic liner 128 as seen in FIGS. 8 and 9 to facilitate the sliding of the door member thereon. Attachment of the fuselage track to the fuselage wall may be accomplished by bolts 209 which extend through the recess 205, the skin of the aircraft fuselage, and the skeleton of the aircraft.

When constructing the present invention sliding aircraft door, the guiding and supporting means on the door must be in contact with the guiding and supporting means on the fuselage along their entire lengths. This will ensure that the enormous load on the door will be uniformly distributed and not concentrated at a few points. To facilitate the construction of the door to the extremely high tolerances necessary to achieve an equal load distribution on the interlocking rails and tracks, the entire door assembly is preferably placed in a jig prior to being secured in place. In the embodiment shown in FIGS. 8 and 9 the wing-shaped door rails, fuselage tracks, door, and aircraft fuselage are placed in the jig. The components are precisely positioned in relation to each other and then clamped in position in the jig. Holes are then formed in the door, fuselage, and track members while held stationary in the jig. Bolts inserted into the holes by nuts may be used to anchor the door assembly means in position.

An air seal is preferably provided to seal any gap between the fuselage opening and door member junction to prevent the pressurized atmosphere inside the aircraft from leaking out to the atmosphere. Simple latches (not shown) located at the ends of the door can provide latching and locking means to maintain the door safely closed during the aircraft flight.

In FIG. 10, of this invention the sliding aircraft door is shown in the closed position in an overhead cross section. The hiring 3 is attached on the leading edge of the door. The door has an additional hiring 300 attached to the trailing edge of the door between the inner skin 18 and the outer skin 17 of the door member to further decrease drag. A leading door edge lip 301, also attached between the inner skin 18 and the outer skin 17 of the door engages a recess in a door stop 302 attached to the fuselage. The door stop acts to prevent the door from travelling off its track as well as helping to seal the door. A door seal 303 also helps to seal the door.

The above disclosed structure of the guiding and supporting means helps to secure the door member in place in the closed position during flight. As the altitude of the aircraft increases, the pressure differential between the inside of the aircraft cabin and the outside atmosphere increases, thereby increasing the load on the skin of the fuselage, including the door. As the load on the door increases, the lips and recesses are forced together and as this occurs, the seal on the door becomes tighter, decreasing the likelihood that the door will accidentally open during flight. Existing aircraft doors, on the other hand, using only hinges and latches to secure the door to the fuselage are more likely to open during flight as the altitude of the aircraft increases.

Since the guiding and supporting means extend over the length of the aircraft door, the sliding door assembly as mounted on the fuselage distributes the load exerted by the door over an extended area of the fuselage. As a result the sliding door of this invention may be of a greatly simplified structure as compared to existing aircraft doors. Known aircraft doors require complex hinges and other supporting and articulating means to attach a door member to an aircraft. Additionally, known aircraft doors require extensive modifications to the underlying aircraft structure to support the door at a very few isolated and concentrated points and to transfer the pressure load on the doors while in flight to other structural members of the fuselage.

The simple means of construction and attachment of the present invention make it especially useful for refitting commercial passenger jets to be used as cargo carriers. To do so, an aperture hole is formed in the fuselage of the aircraft and then the means for supporting and guiding the door are suitably secured to the fuselage. No extensive further modification of the aircraft is required. Therefore, the present invention greatly simplifies the presently known process of refitting aircraft which includes complex structural modifications to distribute the load from the few points of attachment for the door to the fuselage rib members. The presently known process obviously requires much more time and expense.

I claim:

1. A sliding door for covering an opening in an aircraft fuselage comprising:

a sliding door member, including at least one section, mounted on said fuselage and adapted for sliding in the longitudinal direction of the fuselage between an opened and a closed position, supporting and guiding means on said sliding door member and said fuselage for supporting said sliding door in said opened and closed position and supporting and guiding sliding movement of said sliding door member between said open and closed position.

2. A sliding door according to claim 1 wherein said guiding and supporting means comprises track means provided on said fuselage along said opening and corresponding rail means along the top and bottom edge of said door member.

3. The sliding door assembly according to claim 1 wherein the sliding door has a greater vertical height than said opening in the aircraft fuselage.

4. The sliding aircraft door according to claim 1 wherein the sliding door has a greater horizontal length than said opening in the aircraft fuselage.

5. The sliding aircraft door according to claim 1 wherein said guiding and supporting means includes:

an upper and a lower fuselage track, each said track including at least one first lip extending upwardly and outwardly from a fuselage main portion and creating a recess therebetween; and an upper and lower door rail with a surface complementary to and interlocking with said upper and lower fuselage track respectively.

6. The sliding aircraft door according to claim 5 wherein each said upper and lower door rail includes at least one second lip extending downwardly and outwardly from a rail main part and creating a second recess therebetween, said second lip adapted to engage with the corresponding recess in the fuselage track, said second recess being adapted for receiving corresponding one of the said upper and lower fuselage track lips.

7. The sliding aircraft door according to claim 6 wherein said guiding and supporting means further comprises;

an upper and lower door guide means, mounted on the fuselage of the aircraft adjacent to the door opening for supporting said door member in said opened position, said door guide means having a lip-recess configuration for providing a track for said lower and upper door rail.

8. The sliding aircraft door according to claim 4 wherein the surfaces of the lips and recesses are coated with TEFLON.

9. The sliding aircraft door according to claim 6 wherein the surface of the lips and recess are covered with extruded plastic caps.

10. The sliding aircraft door according to claim 4 wherein the upper and lower door tracks are bolted to the fuselage of the aircraft.

11. The sliding aircraft door according to claim 1 wherein said lower and upper track comprises an inner and outer track portion and said inner and outer door rail includes corresponding inner and outer rail portion.

12. The sliding door according to claim 1 wherein the supporting and guiding means includes an interlocking upper door track with a wing shaped rail, said wing-shaped rail including a central bar with an upper rail attached on top of the central bar and a lower rail attached to the lower portion of the central bar, an upper fuselage track including a longitudinal block with an opening formed within its interior, said opening being shaped substantially similar to the upper door track.

13. The sliding aircraft door according to claim 2, wherein said track means is comprised of a plurality of closely adjacent segments.

14. The sliding aircraft door according to claim 12, wherein said fuselage track is comprised of a plurality of closely adjacent segments.

* * * * *